United States Patent [19]

Aoki et al.

[11] Patent Number: 4,814,132

[45] Date of Patent: Mar. 21, 1989

[54] PROCESS FOR PREPARING A THIN FILM

[75] Inventors: Takao Aoki; Norio Kawabe, both of Otsu, Japan

[73] Assignee: Toray Industries, Inc., Tokyo, Japan

[21] Appl. No.: 214,911

[22] Filed: Jun. 28, 1988

Related U.S. Application Data

[63] Continuation of Ser. No. 820,696, Jan. 21, 1986, abandoned.

[30] Foreign Application Priority Data

Jan. 25, 1985 [JP] Japan .................................. 60-10938
Mar. 26, 1985 [JP] Japan .................................. 60-61597

[51] Int. Cl.$^4$ ..................... B29C 39/14; B29C 41/24; B29D 7/01
[52] U.S. Cl. ................................... 264/165; 264/204; 264/298
[58] Field of Search ............... 264/298, 204, 207, 212, 264/216, 45.8, 46.4, 165; 156/246

[56] References Cited

U.S. PATENT DOCUMENTS

| | | | |
|---|---|---|---|
| 2,641,022 | 6/1953 | Kress | 425/326.1 |
| 2,708,617 | 5/1955 | Magat et al. | 264/298 |
| 3,767,737 | 10/1973 | Lundstrom | 264/216 |
| 3,892,665 | 7/1975 | Steigelmann et al. | 264/298 |
| 3,989,466 | 11/1976 | Pan | 210/203 |
| 4,155,793 | 5/1979 | Salemme et al. | 264/298 |
| 4,279,855 | 7/1981 | Ward, III | 264/298 |
| 4,451,374 | 5/1984 | Peterson et al. | 210/656 |

FOREIGN PATENT DOCUMENTS 58-92526 6/1983 Japan.
59-22724 2/1984 Japan.

OTHER PUBLICATIONS

Paul Hiemenz, "Principles of Colloid and Surface Chemistry", 1977, pp. 210–211, 223–224.
J. Philip Bromberg, "Physical Chemistry", 2nd ed., 1984, p. 382.

Primary Examiner—Jan H. Silbaugh
Assistant Examiner—Karen D. Kutach
Attorney, Agent, or Firm—Austin R. Miller

[57] ABSTRACT

A process for preparing a thin film having a large area. A casting solution of a film-forming material and a solvent is fed to the surface of a liquid substrate immiscible with the solution by utilizing interfacial tension. Spontaneous spreading of the casting solution occurs across the surface of the liquid substrate and evaporation of the solvent produces a thin film on the liquid surface which is continuously collected. The feed of the casting solution to the surface of the substrate is at least either a material which shows selective wettability for the casting solution in preference to the liquid substrate or a structure capable of developing capillarity.

10 Claims, 2 Drawing Sheets

PROCESS FOR PREPARING A THIN FILM

This application is a continuation of application Ser. No. 820,696, filed 1/21/86, now abandoned.

FIELD OF THE INVENTION

The present invention relates to the preparation of a thin film, using a casting process on the surface of a liquid.

DESCRIPTION OF THE PRIOR ART

It is well known in the art that one of the processes for preparing a thin film is a water casting process wherein a droplet of a casting solution of a polymer in a water-immiscible solvent is deposited on the surface of water, the solution spreads rapidly over the water surface, and then the thin film is left floating on the surface of the water after evaporation of the solvent of the solution. The process utilizes spread of the solution on the basis of an interfacial phenomenon between a droplet of the solution and the surface of the water. However, the above-mentioned process exhibits some difficulties if it is desired to obtain a thin film having a large area and to produce such a film continuously.

A variety of processes have recently been proposed for preparation of a thin film having a large area. Particularly, there have been proposals to remove the defects of the conventional processes by supplying a polymer solution in a linear form instead of droplet form onto the surface of water. They include, for example, (1) a process which comprises dropping a polymer solution on the surface of water in an area thereof partitioned by a pair of partition rods while, at the same time, expanding the distance between the partition rods, (2) a process which comprises allowing a solution of a polymer in a solvent having a higher density than that of water to adhere onto the surface of a rotating roll, passing through a reservoir of the solution disposed under the surface of the water, and pulling up the adherent solution to forcibly spread the solution on the surface of water (U.S. Pat. No. 3,767,737), (3) a process which comprises spreading a polymer solution on the surface of water by controlling the mutual liquid surface position between the water phase and the polymer solution phase (Japanese Patent Laid-Open No. 92,526/1983), and (4) a process which comprises supplying a polymer solution along a plate, one side of which is immersed in water, onto the surface of water (Japanese Patent Laid-Open No. 22,724/1984).

However, these processes still have defects. Specifically, the process (1) is limitative in that a thin film cannot be continuously obtained. In the process (2), uniformity of the thin film is spoiled because transfer of the solution adherent on the roll onto the surface of the water may not necessarily be completely effected. In continuous preparation of a thin film according to the process (3) or (4), the balance between the rate of removing the formed thin film and the rate of supplying the polymer solution must be accurately controlled.

SUMMARY OF THE INVENTION

An object of the present invention is to provide a satisfactory process for continuous preparation of a thin film of reasonable width.

In the present description the film-forming liquid or solution of the film forming material in solvent will often be referred to as the "casting solution" or the "first liquid" and the liquid, usually water, onto the surface of which the first liquid is fed, will often be referred to as the "liquid substrate" or the "second liquid".

In the process of the present invention the first liquid is fed to the surface of the second liquid by utilizing interfacial tension. The thin film formed on the surface of the second liquid is collected continuously therefrom during normal operation of the process.

The step of continuously collecting the thin film from the surface of the second liquid may be stopped and started again at will as, for example, in a batchwise process where batches of film are collected on different respective rollers. Thus, the collection of the film may be stopped to allow a change of rollers. Such batchwise processes are continuous processes within the present invention.

The feed of the first liquid to the surface of the second liquid may be effected through a feed material which shows selective wettability for the first liquid in preference to the second liquid. Alternatively use may be made of one or more capillaries open at one end to the first liquid and elsewhere to the surface of the second liquid.

From another aspect of the invention apparatus for forming a thin film comprises at least a container for containing at least a second liquid, thereby providing a surface of the second liquid on which the film is formable, a feed for feeding, on to the surface of the second liquid, a first liquid comprising a solution of film forming material in a solvent, whereby a film can be formed on the surface of the second liquid, and a film collector for continuously collecting film from the surface of the second liquid, characterized in that the feed comprises feed means capable of utilizing interfacial tension so as to cause the first liquid to flow, by virtue of the said interfacial tension, on to the surface of the second liquid.

The present invention provides significant improvements over known water casting processes in that (1) the width of the thin film can be expanded by introducing the first liquid over a great width, (2) spontaneous supply of the first liquid by interfacial tension makes accurate control for supply of the solution unnecessary. Accordingly, a thin film even with a large width, which is difficult to prepare with the conventional process, can be continuously prepared with a very simplified apparatus.

BRIEF DESCRIPTION OF THE DRAWINGS

This invention will be better understood from the following detailed description taken with the accompanying drawings.

DETAILED DESCRIPTION OF THE PREFERRED EMBODIMENTS

Figure 1:
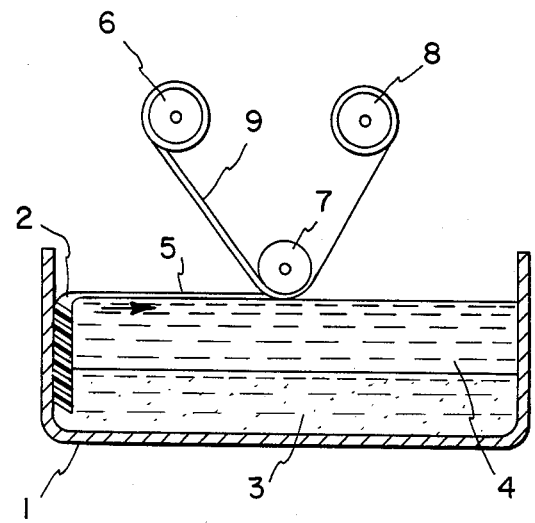
FIG. 1 is a crosssectional view of one form of apparatus suitable for practicing the process of this invention.

Referring now to the drawing (FIG. 1), a first liquid 3, which is a film-forming solution of a film-forming material as the main component in an organic solvent, is present in the bottom of a tray 1. A second liquid serving as a liquid substrate 4 is poured thereon. A supply channel 2 of fluid conductive material for the first liquid is provided near or in touch with the wall of the tray. The supply channel 2 has one end opening into the first liquid 3 and another end opening on the surface of the second liquid 4. The channel port has any kind of structure such as fine tubes or a fine slit, in so far as it can develop such capillarity as to conduct the first liquid 3 up to the surface of the second liquid 4 by capillary demand.

As soon as the first liquid 3 is supplied on the second liquid surface through the supply channel 2, the first liquid spreads across the second liquid 3 surface, and the organic solvent of the first liquid is removed by evaporation to produce the thin film 5 on the second liquid surface. A support sheet having a film-supporting layer 9 is continuously and sequentially unwound from a supply roll 6, passed around a control roll 7, and wound on a takeup roll 8. The support layer 9 is continuously passed into contact with the thin film 5 to continuously remove it upwardly from the liquid surface. In winding operation release paper may be laminated between the thin films, and the support may be an endless belt. The film thickness can be adequately controlled by adjusting the rate of winding of the support layer 9.

As described above, when the thin film 5 is continuously taken up, the first liquid is continuously supplied onto the surface of the second liquid through the supply channel 2 by capillary action.

Thus the thin film is continuously prepared.

In FIG. 1, the first liquid 3 may, of course, be continuously supplied from outside. Both the first and the second liquids are not always required to be put into a tray, but may be separately put into two or more trays.

Figure 2:
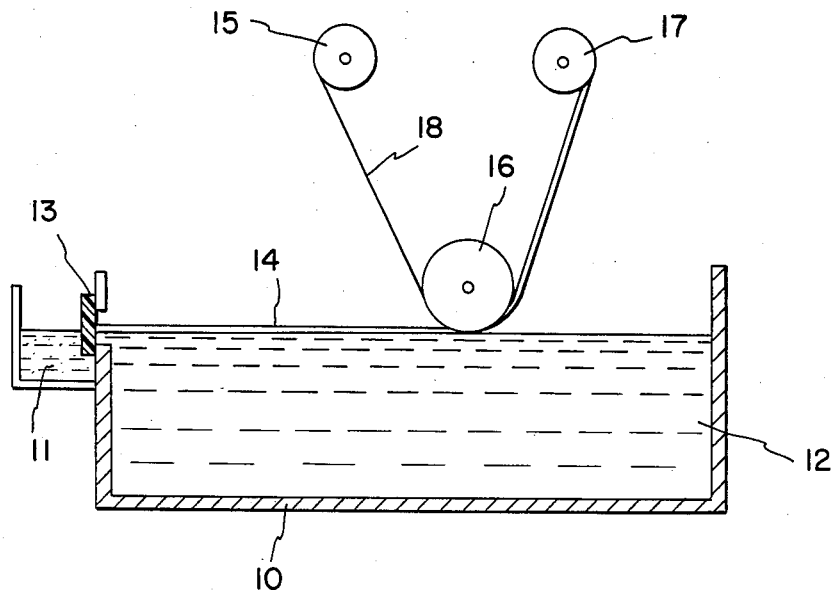
FIG. 2 is a crosssectional view of another form of apparatus suitable for practicing another preferred embodiment of the invention.

FIG. 2 shows another preferred embodiment of the invention which has significant differences from FIG. 1.

A supply port 13 may comprise a non-woven fluororesin fabric of fluid coductive material placed vertically between the first liquid 11 and the second liquid 12.

The first liquid 11 is a film-forming solution of the film forming material and the second liquid plays the role of a liquid substrate. As the first liquid 11 is more permeable to the supply port 13 than the second liquid 12, only the first liquid 11 is kept in the pores of the supply port.

As the first liquid penetrates through supply port 13 to the second liquid, the first liquid is spread along an interface between the second liquid and the upper space over the second liquid. Spreading and evaporation produce a thin film 14. In this embodiment, the means for taking up the thin film can be the same as in FIG. 1, the rolls 6, 7 and 8 of FIG. 1 having been numbered 15, 16 and 17 and the support 9 having been numbered 18.

In the present invention, the supply of the first liquid by utilizing interfacial tension may be effected either by a material which shows selective wettability for the first liquid in preference to the second liquid or a structure capable of developing capillarity (as in FIG. 1). An index of selective wettability is the critical surface tension of the material.

The material which shows selective wettability for the first liquid rather than the second liquid will be explained in detail hereinafter.

Whether or not a given material is one having selective wettability for a first liquid rather than for a second liquid may be determined by examining values of contact angles between the flat surface of the material and respective droplets of the first liquid and the second liquid, which values are measured after the droplets of these liquids are dropped on the flat surface of the material. When the value of the contact angle formed by a droplet of the first liquid is smaller than that of the contact angle formed by a droplet of the second liquid, the material has a selective wettability for the first liquid rather than for the second liquid, that is, the material is a desired material. The contact angles of the material with the first liquid and the second liquid can be easily measured by a contact angle meter. Where a substance which is capable of significantly changing the polarity and surface tension of a solution, such as a surface active agent, is contained in neither the first liquid nor the second liquid, a comparison of the contact angle between the solvent of the first liquid and the material with the contact angle between the second liquid and the material may be made more readily. The larger the difference between the contact angle formed by the second liquid and that formed by the first liquid, the more selective the wettability of the material for the first liquid, and, hence, the more effective the smooth and stable supply of the first liquid. In the present invention, the solvent of the first liquid is preferably a nonpolar organic solvent, and the second liquid is preferably water. So a feed material which has a critical surface tension of 30 dyn/cm or less is preferred. Specific examples of materials having a selective wettability for the first liquid rather than for the second liquid include fluoropolymers such as polytetrafluoroethylene, polytrifluoroethylene, polyvinylidene fluoride, tetrafluoroethylene-fluoroalkylvinylether copolymer, tetrafluoroethylene-hexafluoropropylene copolymer and tetrafluoroethylene-ethylene copolymer; polyolefins such as polyethylene and polypropylene; and silicone polymers such as polyorganosiloxane. Particularly preferred materials are fluoropolymers which are hardly eroded by either the first liquid or the second liquid.

The supply of the first liquid onto the second liquid by utilizing the selective wettability of a feed material for the first liquid makes use of the following phenomenon of interfacial chemistry. In general, when a solid surface S is covered by a liquid phase A, dropping of a liquid B immiscible with the liquid A into the interface S/A may allow the liquid B to spread over the solid surface S by pushing the liquid A aside, provided that the interfacial free energy of the interface S/B is lower than that of the interface S/A. In the present invention, the free energy secured by using a feed material having a selective wettability for the first liquid rather than for the second liquid is the driving force of supply of the first liquid.

The specific method of supplying the first liquid onto the second liquid by utilizing selective wettability according to the above-mentioned principle is not particularly limited in the present invention. There can be mentioned a method in which the second liquid is poured over the first liquid contained in a vat or a tray form of container having an internal wall of a material having a selective wettability for the first liquid rather than for the second liquid. In this case, the first liquid rises up along the said internal wall of the container while pushing the second liquid aside, and spread of the first liquid over the second liquid begins immediately.

Structures capable of giving rise to capillarity include those having a capillary tube or tubes, those having a slit provided by two plates, and a plate having grooves in the surface, as well as woven or knitted fabrics, non-woven fabrics, and polymer foams having open cells, microporous membranes, microporous glass, microporous ceramics, and microporous metals. In any structure where capillarity is afforded by opening(s) or slit(s) having an entry at one end and an exit at the other, strict control of the position of the surface of the second liquid in agreement with the exit of the opening(s) or slit(s) is necessary for fast and stable supply of the first liquid.

In any structure where capillarity is afforded by groove(s) or continuous microporous structure running from the first liquid through the second liquid to air, such as a non-woven fabric and a plate having grooves in the surface, since the surface of the second liquid can always be in contact with the opening(s), strict control of the position of the surface of the second liquid is not needed to facilitate preparation of a desired thin film.

In the present invention, the first liquid is preferably fed to the surface of the second liquid by means of an element capable of giving rise to capillarity and also having a selective wettability for the first liquid rather than for the second liquid, thus facilitating more stable supply of the first liquid due to the combined effect of capillarity and wettability with the first liquid. For that purpose, use of, for example, a polytetrafluoroethylene plate having an arbitrary shape and an arbitrary number of grooves formed or a commercially available non-woven fluororesin fabric (trade name: Polyflon Paper manufactured by Daikin Kogyo Co., Ltd.) is preferred. The amount of the first liquid supplied can be easily controlled by varying the width and depth of the grooves in the structure or the porosity of the non-woven fabric.

In case of the non-woven fluororesin fabric, the first liquid may be fed to the surface of the second liquid by arranging the fabric vertically between the first liquid and the second liquid as previously described and shown in FIG. 2. In this arrangement, the first liquid selectively permeates the fabric and spontaneous spreading of the first liquid occurs on the surface of the second liquid from the other side of the fabric.

In the present invention, examples of the film forming material generally include any kind of polymer capable of forming a substantially non-porous film by solvent casting (including mixtures of polymers, graft polymers, block polymers, and copolymers). These polymers may be natural or synthetic. Organic polymers, inorganic polymers, or mixed organic and inorganic polymers may be used. In general, various kinds of polymers can be used depending on application or use of the thin film. Examples of these polymers include synthetic polymers, e.g., general-purpose polymers such as polyolefins, vinyl polymers, poly(meth) acrylates, polyamides, polyesters, and polyethers; engineering plastics such as acrylonitrile-butadiene- styrene copolymer, polyphenylene oxide, polycarbonate, polysulfone, polyether-sulfone, methylpentene polymer, and polyethylene terephthalate-isophthalate copolymer; polyorganosiloxane; and natural polymers such as cellulose derivatives and polyamino acids. However, usable polymers are not limited to those mentioned above. More specifically, polymers capable of providing a liquid separation performance, among others, those capable of being employed for removal of salts, recovering of valuable materials, and the like according to reverse osmosis, can be employed. They include cellulose derivatives, e.g., cellulose diacetate, and cellulose triacetate, aromatic polyamides, polyamide hydrazide, polyamide acids, polyimidazopyrolone, polysulfonamide, polybenzimidazole, polybenzimidazolone, polyarylene oxide, polyvinyl methyl ether, polyacrylonitrile, polyhydroxyethyl methacrylate, and polyvinylidene carbonate. Examples of polymers usable in water-alcohol separation or separation of an organic liquid include polyurea, polyether amides, polyether urea, polyamides, polyesters, polyethers, polyvinyl halides, cellulose derivatives, polysaccharides such as chitin and chitosan, silicon-containing polymers such as polysiloxane, and substituted acetylene polymers such as poly(1-trimethylsilyl-1-propyne). Examples of polymers usable in gas separation include vinyl polymers such as poly(4-methyl-1-pentene), polybutadiene, polystyrene, polyalkyl acrylates, polyalkyl methacrylates, and polyvinyl pivalate; cellulose derivatives such as ethylcellulose; polycarbonate; polyphenylene oxide and derivatives thereof; polysulfone; fluorine-containing polymers; substituted acetylene polymers such as poly tert-butylacetylene, polyorganosiloxane and derivatives thereof; and inorganic polymers such as polyphosphazene.

Further, amphipathic substances capable of forming a monomolecular membrane according to the Langmuir-Brodgett method or the like, examples of which include carboxylic acids and alcohols having a long-chain alkyl group, and biolipids such as cholesterol, can be used as the film forming materials.

In the present invention, a solvent capable of uniformly dissolving a film forming material, and having a lower surface tension than that of a liquid substrate (the second liquid) and such an adequate volatility as to allow easy removal thereof from a thin layer of a casting solution spread on the surface of the liquid substrate may be employed as the solvent of the first liquid (the casting solution).

A solvent whose spreading coefficient represented by equation (1) is positive can be preferably used as the solvent in the casting solution.

Spreading coefficient: $S = \gamma w - \gamma wo - \gamma o$ (1)

$\gamma w$: surface tension of the second liquid
$\gamma o$: surface tension of the solvent
$\gamma wo$: interfacial tension between the second liquid and the solvent As to the spreading coefficient, a general-purpose organic solvent whose surface tension is 35 dyn/cm or less almost always shows a positive value where water is the second liquid and is therefore preferred.

If desired, in order to obtain stable and large spreading of the first liquid on the surface of water, where water is the second liquid, a polymer or a compound having a hydrophilic group can be added to the first liquid. In the present invention, examples of a polymer having a hydrophilic group include any kind of oil-soluble polymer having a carbonyl group, a hydroxyl group, an amino group, or an ammonium group. And a polymer having non ionic hydrophilic group such as polyethylene glycol or polypropylene glycol can be used. Preferably, commercial polyolefinpolyol (trade name; Polytel manufactured by Mitsubishi Chemical Industry) can be used because of its solubility to a film-forming material such as polyolefin. An amino-functionalized polydimethylsiloxane or carbinol-functionalized polydimethylsiloxane can also be used with silicone-containing film-forming materials. Further examples of the compound having a hydrophilic group include various of organic compounds such as alcohols, carboxylic acids, peroxides, aldehydes, ketones, amines, or amides. In these compounds, oil-soluble surface active reagents are preferred. When the first liquid including such surface active reagent is supplied on the surface of the second liquid, the surface active reagent is rapidly absorbed on the interface between the first liquid and the second liquid to reduce the interfacial tension and help the stable spreading of the first liquid. As examples of oil-soluble surface active reagents, sorbitan monolaulate, sorbitan monopalmitate, sorbitan monostearate, sorbitan monooleate, polyoxyethylene sorbitan monolaurate, polyoxyethylene sorbitan monooleate, and fluoro-containing surface active reagents are suitable. The concentration of the polymer or the compound having a hydrophilic group in the first liquid may be, e.g., up to about 0.5% by weight, and preferably from about 0.001% to about 0.1% by weight.

Examples of solvents used in the casting solution include aliphatic hydrocarbons such as n-hexane, cyclohexane, n-heptane, and cyclohexene, and derivatives thereof; aromatic hydrocarbons such as benzene, and derivatives thereof; and halogen-containing organic solvents such as trifluorotrichloroethane (boiling point: 47.6° C., specific gravity: 1.57, surface tension at 25° C.: 17.8 dyn/cm), carbon tetrachloride (boiling point: 76.7° C., specific gravity: 1.59, surface tension at 25° C.: 26.9 dyn/cm), chloroform (boiling point: 61°–62° C., specific gravity: 1.48, surface tension at 25° C.: 25.5 dyn/cm), methylene chloride (boiling point: 39.75° C., specific gravity: 1.33, surface tension at 25° C.: 2.0 dyn/cm), and 1,1,1-trichloroethane (boiling point: 74.1° C., specific gravity: 1.34) and carbon tetrachloride. When a film forming material is only soluble with difficulty in the above-mentioned solvent, the casting solution may be prepared by dissolving the film forming material in a solvent capable of dissolving the same and subsequently diluting the resulting solution with the above-mentioned solvent.

Various kinds of mixtures such as those of organic solvents as mentioned above, or an organic solvent as mentioned above and other solvents may also be used. Preferably, the solvent is arbitrarily chosen with due consideration for solubility of a film forming material to be used, operational conditions, etc. The presence of a solvent other than organic solvents does not provide any problems in so far as it is used in such an amount as not to spoil the effect of the present invention.

The concentration of the film forming material in the solvent depends on the nature of the film forming material, so suitable concentration may be determined by experimental data. But, in general, the concentration of the film forming material may be, e.g., up to about 10% by weight, and preferably is from about 0.01 to about 5% by weight.

A liquid which is substantially immiscible with the casting solution and forms a clear interface therewith, which does not dissolve the film forming material or erode the thin film formed, and which has a high surface tension, 60 dyn/cm or more, is preferred as the liquid substrate (the second liquid). Although any liquid having such properties may be employed, polar liquids are preferred. Among them, water (specific gravity: 1.0, surface tension at 25° C.: 72.8 dyn/cm) is particularly preferred. The process of this invention is sufficiently operable with water alone. However, an aqueous solution of an inorganic salt may be used for decreasing the solubility of the film forming material or increasing the surface tension, which may facilitate formation of a thinner film.

In the present invention, solvent removal (evaporation) from the thin layer of the casting solution formed on the liquid substrate is preferably effected by controlling the ambient temperature or the like. For example, when trifluorotrichloroethane (boiling point: 47.6° C.) or methylene chloride (boiling point: 39.8° C.) is used as the solvent of the casting solution, solvent removal from the formed thin layer of the casting solution is spontaneously and quickly effected by setting the ambient temperature at 25° to 28° C. to form a thin film consisting essentially of the film forming material as such. When a solvent having a high boiling point is used, control of the temperature according to infrared irradiation or the like is preferred in forming a uniform film on the surface of the liquid substrate without disturbing the surface of the latter. Alternatively, a current of air may be moderately blown over the surface, or the pressure of the space on the surface may be maintained on a reduced level.

In the present invention, the gas present in the space may be of any kind. Air, nitrogen gas, water vapor, carbon dioxide gas, or the like can be employed properly in accordance with the property of the formed thin film. Above all, film formation is most preferably effected in air from the viewpoints of safety and economy.

In this invention, as already mentioned, a spontaneous supply of the first liquid can be achieved by a stationary feed which utilizes interfacial tension, however, a little moving may be included in supplying of the first liquid by the interfacial tension so far as it which does not disturb the second liquid surface.

The thickness of the film prepared by the process described above is controlled by; (1) the rate at which the first liquid is delivered to the surface of the second liquid, which is controlled by the means employed to feed it; (2) the concentration of the film-forming material in the first liquid (lower concentrations provide thinner films) and (3) the rate at which the film is drawn upwardly from the liquid substrate on a take-up roll (the faster the rotation of the roll, the thinner the film will be).

Any customary method can be adopted in taking up the formed thin film. For example, there can be mentioned a method of winding it up on a rotating roll in contact with the surface of the liquid substrate, and a method of taking it up on a support by means of a take-up roll, though the method of taking up the thin film is not limited thereto.

Various kinds of support can be used as required. For example, thin metal film can be used for the manufacture of condensers. In case of manufacturing semipermeable membranes, a porous support is preferred. Suitable porous supports include, e.g., microporous polypropylene (available from Celanese Plastics Company under the trademark Celgard), Solvinert TM ultrafiltration membranes (available from Millipore Corporation), microporous nylon-reinforced poly (vinyl chloride-acrylonitrile) (available from Gelman Instrument Company under the trademark Acropor), microporous polytetrafluoroethylene (available from W. L. Gore and associates, Inc. under trademark GORE-TEX), microporous polysulfone, and microporous cellulose acetate. If desired, in order to improve adhesion between the thin film and the support, surface treatment or surface coating can be done applied to the surface of the support.

The following Examples will further illustrate the present invention.

REFERENTIAL EXAMPLE

The affinities of polytetrafluoroethylene for various solvents used in the following Examples were examined by measuring the contact angles of the various solvents on a polytetrafluoroethylene plate using a contact angle meter model CA-D manufactured by Kyowa Kaimenkagaku K.K. The results shown in Table 1 were obtained.

TABLE 1

| Solvent | Contact angle |
| --- | --- |
| trichlorotrifluoroethane | about 12° |
| 33 wt. % cyclohexene-trichloro-trifluoroethane solution | about 15° |
| chloroform | about 22° |
| water | 97° |

EXAMPLE 1

A 2 wt. % chloroform solution of polycarbonate (trade name: "Lexan" 121-111 manufactured by General Electric Co.) was prepared. 100 ml of this solution was poured into a polytetrafluoroethylene-coated tray of 20 cm (length) ×17 cm (width)×2.5 cm (depth) at a room temperature of about 25° C. Distilled water was added onto the solution in such an amount as to cover substantially the whole surface of the polymer solution. Thus, a thin layer of the polymer solution was formed all over the surface of distilled water, and the solvent was gradually removed to form a thin film, which was then continuously recovered from the surface of water. The film thickness was measured with a dial gauge to be 3.2 μm.

EXAMPLE 2

0.17 weight part of poly(4-methyl-1-pentene) (manufactured by Mitsui Petrochemical Industries, Ltd.) was dissolved in a solvent mixture of 33.16 weight parts of cyclohexene and 66.67 weight parts of trichlorotrifluoroethane to prepare a solution. 100 ml of this solution was poured into a polytetrafluoroethylene-coated tray of 20 cm (length)×17 cm (width)×2.5 cm (depth) at a room temperature of about 25° C., followed by addition of 500 ml of distilled water thereonto. A polytetrafluoroethylene plate of 5 cm (height)×14 cm (width)×0.3 cm (thickness) having 9 parallel grooves of 0.5 mm (width)×0.5 mm (depth) provided at intervals of 1.5 cm in the height-wise direction was allowed to stand upright in the above-mentioned container along the wall in the width-wise direction of the container. Here, the grooves provided in the polytetrafluoroethylene plate ran from the poly(4-methyl-1-pentene) solution phase through the water phase to the surface of the water phase. The poly(4-methyl-1-pentene) solution in the lower layer was carried through the grooves to the surface of the water phase and immediately spread over the whole surface of the water phase to form a thin layer of the polymer solution, from which the solvent was gradually removed to form a thin film of the polymer. This thin film was contacted with a rotating roll over which a microporous polysulfone support having a crosslinked polydimethylsiloxane layer in the surface was wound. The thin film was wound up on the support at a rate of 0.5 m/min. During the operation, the polymer solution continuously spread over the surface of the water phase along the grooves provided in the polytetrafluoroethylene plate. Even after the winding operation, the thin film was continually formed over the surface of water.

The film thickness of the poly(4-methyl-1-pentene) layer thus formed was measured according to ellipsometry to be 920 Å. (92 nm)

EXAMPLE 3

0.17 weight part of poly(4-methyl-1-pentene) (manufactured by Mitsui Petrochemical Industries, Ltd.) was dissolved in a solvent mixture of 33.16 weight parts of cyclohexene and 66.67 weight parts of trichlorotrifluoroethane to prepare a solution. 100 ml of this solution was poured in a polytetrafluoroethylene-coated tray of 20 cm×17 cm×2.5 cm at a room temperature of about 25° C., followed by addition of 500 ml of distilled water thereto. A non-woven polytetrafluoroethylene fabric (Polyflon Filter PF-2, manufactured by Toyo Roshi K.K.) of 5 cm (height)×14 cm (width) was allowed to stand upright in the above-mentioned container along the wall of the container in the width-wise direction. In this case, only the poly(4-methyl-1-pentene) solution in the lower layer permeated into the non-woven polytetrafluoroethylene fabric, rose up to the surface of the water layer, and immediately spread over the surface of the water layer. By removing the solvent, a thin film of the polymer was formed. The thin film was continuously recovered onto a microporous polysulfone support having a crosslinked polydimethylsiloxane layer in the surface in the same manner as in Example 2.

The film thickness of the poly(4-methyl-1-pentene) layer was measured according to ellipsometry to be 760 Å (76 nm)

EXAMPLE 4

0.5 weight part of polysulfone (U-del manufactured by Union Carbide Corp.) was dissolved in 99.5 weight parts of chloroform to prepare a solution. Using this solution, a thin film of polysulfone was formed on the surface of water in the same manner as in Example 3. The thin film was recovered from the surface of water, and the thickness thereof was measured with a dial gauge to be 0.8 μm.

EXAMPLE 5

One weight part of poly(2,6-dimethylphenylene oxide) (which is available from Aldrich Chemical Co.) was dissolved in 99 weight parts of chloroform. Using this solution, a thin film of poly(2,6-dimethylphenylene oxide) was formed on the surface of water in the same manner as in Example 2. The thin film was recovered from the surface of water, and the thickness thereof was measured with a dial gauge to be 0.9 μm.

EXAMPLE 6

A thin film consisting of poly(2,6-dimethylphenylene oxide) and polyolefinpolyol (trade name: "Polytel H" manufactured by Mitsubishi Chemical Industry) was prepared in the same manner as in Example 5 except that a casting solution is 1 weight part of poly(2,6-dimethylphenylene oxide) and 0.25 weight part of polyolefinpolyol in 98.75 weight parts of chloroform.

The thin film was 0.5 μm thick.

EXAMPLE 7

A casting solution of 5 weight % of cellulose triacetate in methylene dichloride was prepared.

Using the solution, a thin film was prepared in the same manner as in Example 1.

The film was continuously taken up on a microporous polysulfone support at a rate of 0.5 m/min to form a composite membrane.

The thickness of the film was 1200 Å (120 nm), according to ellipsomety measurement.

Reverse Osmosis performance of the composite membrane was Rej 65.2% and Flux 0.17 $m^3/m^2$·day under the conditions (0.15% NaCl aq. solution, 25° C., 30 $kg/cm^2$).

We claim:

1. In a process for preparing a thin film from a film forming material wherein a first liquid, which is a casting solution of the film forming material in a solvent, is fed onto a surface of a second liquid, which is immiscible with the first liquid and has a surface tension greater than the surface tension of the first liquid, to form a thin layer of the first liquid on the surface of the second liquid, wherein the solvent of the first liquid is removed to form a film of the film forming material, and wherein the film is taken up from the surface, the improvement comprising supplying the first liquid to the surface of the second liquid due to capillary action by a fluid conductive feed material having at least one throughflow aperture in fluid communication between the first liquid and the surface of the second liquid, whereby the selective wettability of the feed material for the first liquid in preference to the second liquid causes the first liquid to pass through the throughflow aperture in the feed material to the surface of the second liquid.

2. A process as claimed in claim 1, wherein the feed material is a fluororesin.

3. A process as claimed in claim 1, wherein the feed material is defined as a porous member having a plurality of throughflow apertures therein.

4. A process as claimed in claim 1 which includes introducing both the first and second liquids into a common container, the first liquid being of a density greater than the second, whereby the denser first liquid forms a lower layer and the second liquid forms an upper layer, and providing a capillary within the container so that the first liquid passes upwardly within the container through the capillary.

5. A process as claimed in claim 1, wherein the feed material has a critical surface tension of no more than about 30 dyn/cm.

6. A process as claimed in claim 1, wherein the surface tension of the solvent in the first liquid is no more than about 35 dyn/cm and the surface tension of the second liquid is more than about 60 dyn/cm.

7. A process as claimed in claim 6, wherein the second liquid is water.

8. A process as claimed in claim 1, wherein the first liquid is fed to the surface of the second liquid through a capillary open at one end to the first liquid and at another end to the surface of the second liquid.

9. A process as claimed in claim 8, wherein the first liquid is fed to the surface of the second liquid through a plurality of capillaries comprising continuous micropores each open at one end to the first liquid and at another end to the surface of the second liquid.

10. A process as claimed in claim 8, wherein the capillary is defined as a fine slit and has an opening to the surface of the second liquid whereby an essentially linear source of the first liquid is fed through the opening onto the surface of the second liquid.

* * * * *

UNITED STATES PATENT AND TRADEMARK OFFICE
CERTIFICATE OF CORRECTION

PATENT NO. : 4,814,132

DATED : March 21, 1989

INVENTOR(S) : Takao Aoki, Norio Kawabe

It is certified that error appears in the above-identified patent and that said Letters Patent is hereby corrected as shown below:

Column 7, line 29 change 2.0 to 28.0.

Signed and Sealed this

Twenty-ninth Day of May, 1990

*Attest:*

HARRY F. MANBECK, JR.

*Attesting Officer*      *Commissioner of Patents and Trademarks*